United States Patent
Nguyen et al.

(10) Patent No.: US 8,457,153 B2
(45) Date of Patent: Jun. 4, 2013

(54) HDMI-SFP+ ADAPTER/EXTENDER

(75) Inventors: Anthony Nguyen, San Jose, CA (US); David Lai, Mountain View, CA (US); Norman Tang, Los Altos, CA (US); Nick Peng, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 13/079,761

(22) Filed: Apr. 4, 2011

(65) Prior Publication Data

US 2012/0249871 A1  Oct. 4, 2012

(51) Int. Cl.
*H04J 3/22* (2006.01)

(52) U.S. Cl.
USPC .......... 370/466; 370/465; 370/463; 370/464; 370/546; 370/474

(58) Field of Classification Search
USPC ................ 370/89, 463, 546, 474, 464, 466
See application file for complete search history.

(56) References Cited

U.S. PATENT DOCUMENTS

| | | | |
|---|---|---|---|
| 7,088,398 B1* | 8/2006 | Wolf et al. | 348/423.1 |
| 7,576,663 B2* | 8/2009 | Hoffert et al. | 341/51 |
| 7,937,644 B2* | 5/2011 | Schmidt et al. | 714/758 |
| 8,253,859 B2* | 8/2012 | Suzuki et al. | 348/554 |
| 2008/0181203 A1* | 7/2008 | Jones et al. | 370/353 |
| 2009/0022176 A1* | 1/2009 | Nguyen | 370/466 |
| 2009/0046993 A1* | 2/2009 | Nishio | 386/96 |
| 2009/0052599 A1* | 2/2009 | Yanagisawa et al. | 375/354 |
| 2010/0321573 A1* | 12/2010 | Bohm | 348/554 |
| 2011/0170011 A1* | 7/2011 | Choi et al. | 348/725 |

\* cited by examiner

*Primary Examiner* — Linh Nguyen
(74) *Attorney, Agent, or Firm* — Meunier Carlin & Curfman, LLC

(57) ABSTRACT

The practical transmission range of an electrical cable can be extended by converting between electrical and optical signals using an HDMI-optical converter that receives an SFP+ optics transceiver. A pair of SFP+-based HDMI adapters/extenders can connect to a pair of HDMI cables, where one of the HDMI cables is connected to an HDMI Source and one of the HDMI cables is connected to an HDMI Sink. Each of the SFP+-based HDMI cable extenders can terminate with an SFP+ port to house a hot pluggable SFP+ transceiver. The apparatus can transmit 10 G video data to the distance that is supported by the SFP+ product.

16 Claims, 2 Drawing Sheets

HDMI-SFP+ ADAPTER/EXTENDER

BACKGROUND

The transmission of digital video is a driving force in the growth of networking and the Internet. Video is also driving the expansion of wavelength-division multiplexing (WDM) transport networks that transmit data at a maximum rate of 10.3125 Gigabits per second (Gbps) per wavelength. A popular digital video interconnect interface is HDMI (High-Definition Multimedia Interface), which is a digital alternative to consumer analog standards such as radio frequency, coaxial cable and so on. HDMI is a compact audio/video interface for transmitting uncompressed digital data. HDMI cables can connect digital audio/video sources including but not limited to set-top boxes, DVD players, Blu-ray players, personal computers, etc. to compatible digital audio/video devices, computer monitors, and digital televisions, etc. HDMI version 1.3 and 1.4 can transmit digital data at rates up to 10.2 Gbps but a typical HDMI cable length is less than ten meters. Although no maximum length for an HDMI cable is specified, signal attenuation limits useable lengths in practice. In practice HDMI cables rarely exceed twenty-five feet.

The SFP (small form-factor pluggable) module is a compact transceiver used for telecommunication and data communications applications. It typically interfaces a network device motherboard for a switch, router or media converter to a fiber optic or copper networking cable. SFP transceivers support a number of communications standards including SONET, Ethernet Fibre Channel and others. SFP+ is an enhanced small form-factor pluggable module that supports data rates up to 10 Gbps. Its low cost makes widespread adoption of the 10 GE (10 Gigabit Ethernet) standard more attractive.

SUMMARY

The reach of an HDMI cable can be extended by an apparatus that converts electrical signals to optical signals and converts optical signals to electrical signals. A pair of SFP+-based HDMI adapters/extenders can connect to a pair of HDMI cables, where one of the HDMI cables is connected to an HDMI Source and one of the HDMI cables is connected to an HDMI Sink. Each of the SFP+-based HDMI cable extenders can terminate with an SFP+ port to house a hot pluggable SFP+ transceiver. The apparatus can support the distance that is supported by the SFP+ product.

In accordance with some implementations, there is provided an HDMI (High-Definition Multimedia Interface)-SFP+ (Enhanced small form-factor pluggable) converter that includes a first converter that converts HDMI signals of a first type to SFP signals of a second type, and a second converter that converts the SFP signals of the second type to the HDMI signals of the first type. The signals of the first type may comprise electrical signals and the signals of the second type may comprise optical signals. The second converter may recover an HDMI clock signal present in the HDMI signals of the first type that are input to the first converter.

In accordance with some implementations, there is provided a method of transmitting an HDMI signal from an HDMI source to an HDMI sink. The method may include converting the HDMI signal received from the HDMI source to an optical signal; transmitting the optical signal over an optical cable; receiving the optical signal from the optical cable; converting the optical signal back to the HDMI signal; and outputting the HDMI signal to the HDMI sink.

In accordance with some implementations, there is provided an HDMI transmission path extension apparatus. The extension apparatus may include an HDMI to SFP+ converter, an optical communications link, and an SFP+ to HDMI converter. The HDMI to SFP+ converter may convert 10-bit data of received HDMI signals to 8-bit data in accordance with a Transmission Minimized Differential Signaling (TMDS) clock speed. The SFP+ to HDMI converter may recover an HDMI clock signal present in the HDMI signals input to the HDMI to SFP+ converter.

This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Overview

As noted above, there is a practical limit as to the distance between an HDMI source (e.g., a Blu-ray player, DVR, cable set-top box, or other source of content) and a HDMI sink (e.g., a television or monitor or other display device) can be connected with a cable. That limit is e.g., about 10 meters, where a longer cable will like fail to maintain the quality of video resolution that HDMI Revision 1.3/1.4 10.2 Gbps Transmission Minimized Differential Signaling (TMDS) can support. In particular, a passive or standard HDMI cable can support data rates up to 10.2 Gbps but only for short distances. The reach of an HDMI cable with a built-in booster or amplifier can extend to about 15 meters but can transfer data at a maximum of only about 6.75 Gbps over TMDS. Existing HDMI extenders can extend the useful reach of an HDMI cable to about 33 to 300 meters but cannot support a full data rate of 10.2 Gbps.

The subject matter described herein addresses HDMI cable distance limitations arising in high-definition (HD) televisions, set-top boxes, DVD recorders, Home Cinema and other devices by extending the reach of an HDMI cable by using an HDMI-SFP+ adapter/extender such that the distance between the source and sink can be extended indefinitely, dependent on the optical characteristics of the SFP+ module used. SFP+ modules convert between optical and electrical signals. An SFP+ module does no clock and data recovery. SFP+ modules share a common physical form factor with legacy SFP modules.

As will be described herein, HDMI cable reach can be extended using the SFP+ adapter/extender and 10 GE SFP+ transceivers of the present disclosure. Useful cable reach can be extended to 300 meters using a pair of multi-mode optical fiber cables such as, for example, OM3, as defined by the IEEE 802.3 ae standard. The reach can be further extended using single-mode fibers for 10 GE SFP+ optics and an IEC 61754-20 compliant optic fiber connector such as a Lucent connector (LC). Maximum available resolution for 10.2 Gbps can be supported using a 10 gigabit Ethernet (10 GE) integrated circuit. Video quality, including resolution, refresh rate and color depth can thereby be improved. The maximum resolution over a single link at 24-bit/pixels (px) can be 2560× 1600p75 at 9.986 Gbps bandwidth. The maximum resolution over a single link at 30-bit/px can be 2560×1600 at 60 Hertz (Hz) at a bandwidth of 9.986 Gbps. The maximum resolution over a single link at 36-bit/px can be 1920×1200 at 75 Hz at a bandwidth of 8.647 Gbps and 4096×2160 at 24 Hz at a bandwidth of 10.083 Gbps. The maximum resolution over a single link at 48-bit/px can be 1920×1200p75 at a bandwidth of 9.224 Gbps and 1920×1200p60 at a bandwidth of 9.224 Gbps. 30-bit/px, 36-bit/px and 48-bit/px are sometimes referred to as "deep color mode".

Figure 1:
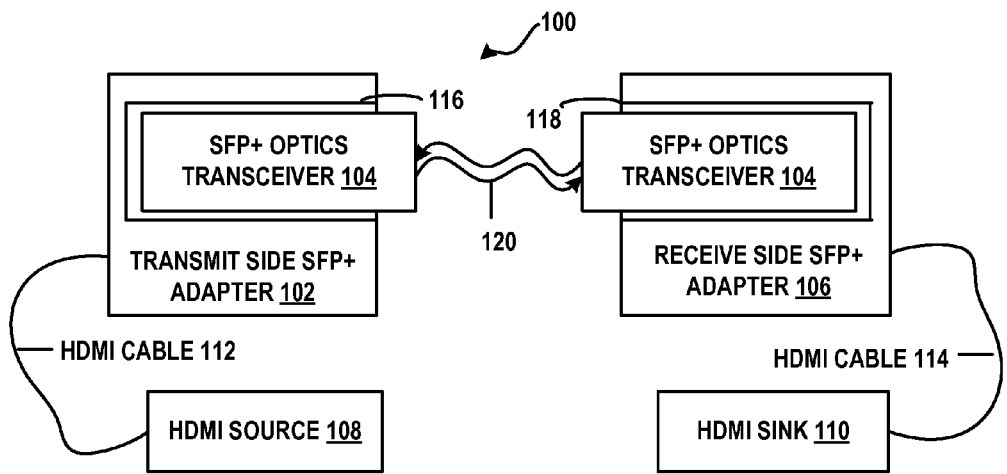
FIG. 1 is a block diagram of an example of an end-to-end connection using an HDMI-SFP+ adapter/extender in accordance with aspects of the subject matter disclosed herein.

FIG. 1 illustrates an example of an end-to-end connection 100 using an HDMI-SFP+ adapter/extender in accordance with aspects of the subject matter disclosed herein. HDMI is an audio/video interface for transmitting uncompressed digital data. An HDMI source device such as HDMI source 108 can be a digital audio/video (AV) source such as but not limited to a set-top box, upconvert DVD player, HD DVD player, Blu-ray Disc player, Advanced Video Coding High Definition (AVCHD) camcorder, personal computer (PC), video game console (e.g., PlayStation 3, Xbox 360, AV receiver and other similar devices) and so on.

One end of an HDMI cable such as HDMI cable 112 can be connected to the HDMI source 108 by insertion of the cable end into a port such as an HDMI 19-pin connector in the HDMI source, the port constructed to receive an HDMI cable end. The other end of the HDMI cable can be connected to a transmit side SFP+ adapter/extender such as transmit side SFP+ adapter 102, as described herein. The transmit side SFP+ adapter/extender can be constructed to have a port to receive the HDMI cable end. The transmit side SFP+ adapter can also include a port such as port 116 that can receive an SFP+ transceiver module such as SFP+ optics transceiver 104. The SFP+ module can interface a network device motherboard or logic board for the transmit side SFP+ adapter/extender to a fiber optic or copper networking cable such as cable 120. The SFP+ module (e.g. SFP+ optics transceiver 104) can support data rates up to 10 GE (10.3126 Gbps). Cable 120 can connect to a second SFP+ optics transceiver 104 plugged into a second SFP+ adapter/extender such as receive side SFP+ adapter/extender 106. The receive side SFP+ adapter/extender 106 can be connected to a second HDMI cable 114 connected to an HDMI sink such as HDMI sink 110. HDMI sink 110 can be any suitable display device including but not limited to a digital television, computer monitor or similar device.

Figure 2:
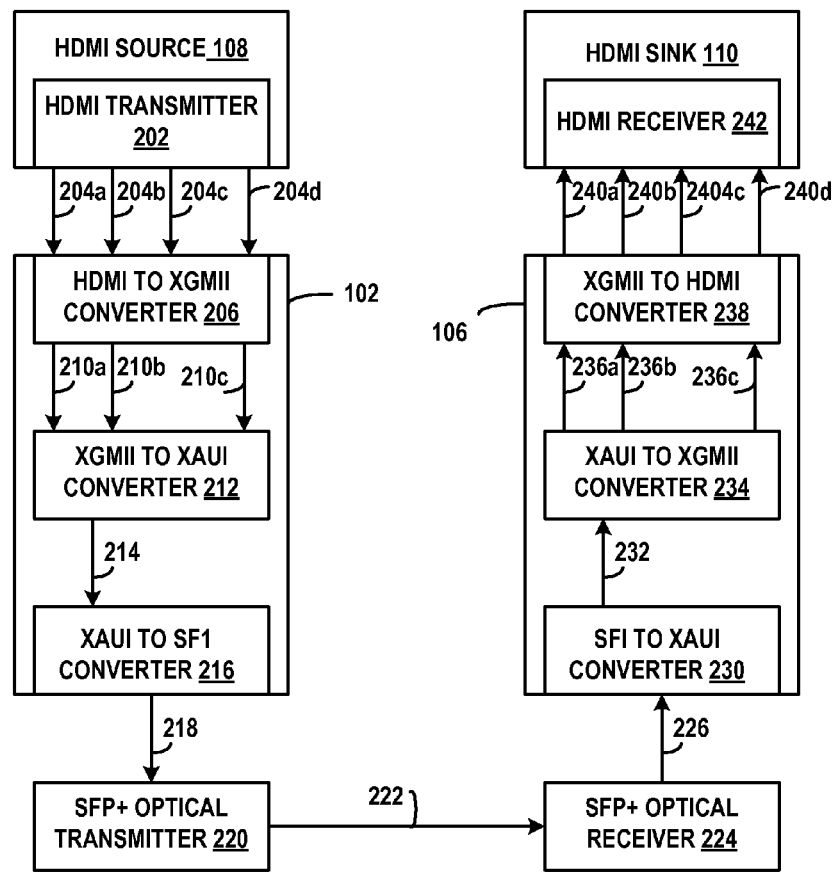
FIG. 2 is a more detailed block diagram of an example of FIG. 1 in accordance with aspects of the subject matter disclosed herein.

FIG. 2 illustrates a more detailed example of portions of FIG. 1 in accordance with aspects of the subject matter disclosed herein. An HDMI source such as HDMI source 108 as described above typically includes an HDMI transmitter such as HDMI transmitter 202 for transmitting data. The HDMI transmitter can employ Transition Minimized Differential Signaling (TMDS), a technology for transmitting high-speed serial data often used by HDMI and Digital Visual Interface (DVI) as well as other digital communication interfaces.

An HDMI transmitter typically receives video, audio and control status information from HDMI source 108. Three TMDS differential pairs are typically used to transfer the video data, each of the three differential pairs or links corresponding to a different red-green-blue (RGB) component. In FIG. 2, three data/control data channels are represented in FIG. 2 by TMDS data channel 0 204a, TMDS data channel 1 204b and TMDS control channel 2 204c. The fourth TMDS channel, TMDS clock channel 204d represents a clock signal generated by the HDMI transmitter, used to coordinate signal processing.

TMDS uses a form of encoding on Video Data. The first stage of the two-stage process converts an input of 8 bits into a 10 bit code with particular properties. In the first stage, the first bit is untransformed and each subsequent bit is either XOR or XNOR transformed against the previous bit. The encoder chooses between XOR and XNOR by determining which will result in the fewest transitions. The ninth bit encodes which operation was used. In the second stage, the first eight bits are optionally inverted to even out the balance of ones and zeros and therefore the sustained average direct current level. The tenth bit encodes whether or not this inversion took place.

The 10-bit TMDS symbol can represent either an 8-bit data value during normal data transmission, or 2 bits of control signals during screen blanking. Of the 1,024 possible combinations of the 10 transmitted bits, 460 combinations are used for representing an 8-bit data value, 4 combinations are used for representing 2 bits of control signals (such as horizontal synchronization (Hsync) and vertical synchronization (VSync)). The remaining 560 combinations are reserved. Control data characters are designed to have a large number of transitions (e.g., 7) to help the receiver synchronize its clock with the transmitter clock.

In FIG. 2, a transmit side HDMI-SFP+ adapter/extender 102 can include one or more of the following: an HDMI to XGMII converter 206, an XGMII to XAUI converter 212 and an XAUI to SFI converter 216. The digital information sent on the four TMDS channels by the HDMI transmitter 202 can be received by an HDMI to XGMII converter 206. XGMII (10 Gigabit Media Independent Interface) is a standard defined in IEEE 802.3 for connecting full duplex 10 Gigabit Ethernet (10 GbE) ports to each other and to other electronic devices on a printed circuit board. It can comprise two 32-bits datapaths (Rx and Tx) and two 4-bits control flows (Rxc and Txc), operating at 156.25 MHz DDR (312.5 MT/s). XAUI is a standard defined in IEEE 802.3. XAUI is a full duplex interface that uses four self-clocked serial differential links in each direction to achieve 10 Gbps data throughput. Each serial link operates at 3.125 Gbps to accommodate both the data and the overhead associated with TMDS coding. The self-clocked nature eliminates skew concerns between clock and data, and extends the functional reach of the XGMII. SFI is an SFP+ Enhanced 10-Gbps pluggable module high-speed serial electrical interface. It uses a single variable speed and has about 10 G lanes to carry a 10.0 G signal and the 64 bit(B)/66 B encoding overhead to yield a 10.3125 G signal.

The HDMI to XGMII converter 206 can convert the HDMI data signals transmitted by the HDMI transmitter to the XGMII interface format. HDMI TMDS data channels 204a (Channel 0), 204b (Channel 1) and 204c (Channel 2) and a TMDS clock signal 204d can be input to the HDMI to XGMII converter 206, which can convert the signals into an Ethernet IEEE 802.3 XGMII interface. For example, the HDMI inputs may be converted to data signals (TXD) 210a, control signals (TXC) 210b and a clock signal 210c, as specified in the IEEE 802.3 standard. In some implementations, there may be an HDMI to XGMII converter 206 for transmit operations and a separate HDMI to XGMII converter 206 for receive operations. The HDMI to XGMII converter 206 may be implemented with an XC5VLX20T (or equivalent) FPGA, available from Xilinx of San Jose, Calif.

The XGMII to XAUI converter 212 can convert the XGMII data signals transmitted by the HDMI to XGMII converter 206 to the XAUI interface format. The XAUI interface format is standard for extending XGMII between the MAC and PHY layers. The XGMII data signal 210a, control signal 210b and clock signal 210c can be received by XGMII to XAUI converter 212 and converted to a XAUI data signal such as XAUI TX signal 214. In some implementations, there may be an XGMII to XAUI converter 212 for transmit operations and a separate XGMII to XAUI converter 212 for receive operations. The XGMII to XAUI converter 212 may be a BCM8011 (or equivalent), available from Broadcom of Irvine, Calif.

The XAUI to SFI converter 216 can convert the XAUI data signals transmitted by the XGMII to XAUI converter 212 to the SFI interface format, which is an interface for SFP+ modules. The XAUI data signal XAUI (e.g., signal TX 214) can be received by the XAUI to SFI converter 216 and converted to SFP+ TX data signal 218. In some implementations, there may be an XAUI to SFI converter 216 for transmit operations and a separate XAUI to SFI converter 216 for receive operations. The XAUI to SFI converter 216 may be a BCM8706 (or equivalent), available from Broadcom of Irvine, Calif.

The SFP+ TX data signal 218 can be received by SFP+ optical transmitter 220 which can convert the electrical signal to an optical signal which can be transmitted over fiber-optic cable 222 to SFP+ optical receiver 224. The optical signal can be received by the SFP+ optical receiver 224 which can convert the optical signal transferred over the fiber 222 to a SFP+ Rx data signal 226.

In FIG. 2, a receive side HDMI-SFP+ adapter/extender 106 can include one or more of the following: a SFI to XAUI converter 230, a XAUI to XGMII converter 234 and an XGMII to HDMI converter 238. The receive side substantially performs the reverse operations of the transmit side, and thus would be understood from the above. The SFP+ Rx data signal 226 created by the SFP+ optical receiver 224 can be received by the SFI to XAUI converter 230. The SFI to XAUI converter 230 can convert the SFP+ Rx data signal to a XAUI Rx signal 232. The XAUI Rx signal 232 can be received by the XAUI to XGMII converter 234 and can be translated to an XGMII RXD data signal 236a, a XGMII RXC control signal 236b and a XGMII Rx clock signal 236c. The XGMII RXD data signal 236a, an XGMII RXC control signal 236b and a XGMII Rx clock signal 236c can be received by the XGMII to HDMI converter 238 and can be converted into TMDS data signals received by the HDMI receiver 242 on TMDS channel 0 240a, TMDS data signals received on TMDS channel 1 240b and TMDS data signals received on TMDS channel 2 240c. The XGMII clock signal can be converted to TMDS clock signal 240d. The HDMI receiver 242 can receive the TMDS signals which can be displayed by the HDMI Sink 110.

It will be appreciated that alternatively, a transmit side SFP+ adapter can be created that combines the functions of HDMI to XGMII converter 206 and XGMII to XAUI converter 212 into a single module using FPGA (Field Programmable Gate Array) technology. Similarly a receive side SFP+ adapter can be created that combines the functions of XGMII to HDMI converter 238 and XAUI to XGMII converter 234 into a single module using FPGA (Field Programmable Gate Array) technology. Moreover, it will be appreciated that an integrated circuit chip can be manufactured that combines the functions of HDMI to XGMII converter 206, XGMII to XAUI converter 212 and XAUI to SFI converter 216. Similarly, an integrated circuit chip can be manufactured that combines the functions of SFI to XAUI converter 230, XAUI to XGMII converter 234 and XGMII to HDMI converter 238. Moreover, the functions of a transmit side SFP+ adapter/extender 102 and a receive side SFP+ adapter/extender 106 can be combined into a single transmit and receive SFP+ adapter.

A standard 802.3 Ethernet frame comprises a preamble (7 octets of 10101010), a start of frame delimiter (I octet of 10101011), a media access control (MAC) destination (6 octets), a MAC source (6 octets), an optional 802.1Q header (4 octets), an Ethertype/Length (2 octets), the payload including data and padding (46 to 1500 octets), cycle redundancy check information CRC32 (4 octets) and an interframe gap (12 octets). After a frame has been sent, transmitters are required to transmit 12 octets of idle characters before transmitting the next frame. In accordance with aspects of the subject matter disclosed herein, the standard Ethernet frame is adjusted or modified slightly to allow more data to be sent in each frame, thereby achieving a higher data transmission rate, as described more fully below.

The HDMI link operates in one of three modes, a video data period, a data island period and a control period. During the video data period, active pixels of an active video line are transmitted. During the data island period audio and auxiliary data are transmitted using a series of packets. The control period is used when no video, audio or auxiliary data needs to be transmitted. A control period is required between any two periods that are not control periods.

HDMI can map an 8-bit based RBG video signal to a 10 bit signal. The extra two bits in the HDMI signal provide for redundancy and error checking. In accordance with aspects of the subject matter disclosed herein, when converting the HDMI signal to the Ethernet standard XGMII signal, the extra two bits can be retained, without removing any redundancy, enabling an 8 G transmission rate. Alternatively the 10-bit HDMI framing schema can be converted to an 8-bit format to support a higher transmission rate. Converting the 10-bit HDMI signal to an 8-bit signal allows more video data to be transmitted, enabling higher data transmission speeds. For example, the payload associated with the XGMII transmit side framing can be an untouched TMDS bit stream if the TMDS clock speed is less than or equal to 320 MHz. Alternatively, the apparatus described herein can map 10-bit TMDS data to 8-bit XGMII data if the TMDS clock speed is greater than 320 MHz. The transmit side framing can be based on standard 802.3 Ethernet framing, adjusted to remove identification of source and destination (MAC destination, 6 octets and MAC source, 6 octets).

Additionally, the idle portion can be inserted or can be removed to adjust timing differences between HDMI and XGMII data. Thus, In accordance with aspects of the subject matter described herein, an example of a format for XGMII transmit side framing can be: 7 octets of preamble (e.g., 10101010), I octet of start of frame delimiter (10101011), reserved space comprising 12 octets (no destination or source), a data field length of 2 octets (12*N+1), 1 octet for an option byte, 1 octet for DDC (display data channel), I octet for CEC (Consumer Electronics Control) connection, N bytes of HDMI payload, where 46<=N+3<=1500), 4 octets reserved space, and a 12*M idle pattern where M<=1. When the TMDS clock speed is <340 MHz and >320 MHz, bits 4 and 3 of the option byte can be set to 00. In accordance with aspects of the subject matter disclosed herein, for XGMII transmit side framing, N (payload bytes) can be set to 3*N1 for a non-video frame. When N1 lies between 15 and 500, the number selected for N1 can be the largest number that does not have a remaining fragment that is less than 15 bytes.

The option byte can be used to identify the type of data in the signal. For example, bits 2-0 can be set to 111 to indicate that the data in the frame is generic or unspecified data. Bits 2-0 can be set to 001 to indicate that the data in the frame is video data only or bits 2-0 can be set to 110 to indicate that the data in the frame is non-video data only (e.g., audio data or control data). The option byte can be set to 000 to conserve power. Bits 4-3 can be set to 11 to signify that the data in the frame is untouched, that is that the data in the frame is an unconverted 10-bit TMDS signal transmission. Bits 4-3 can be set to 00 to signify that the signal is an 8-bit character decoded from the 10-bit TMDS encoded video data, re-mapped 10-bit data island and control data to 8-bit. Bits 4-3 can be set to 01=D[7:0] same as option 00, D[8]=bit 9 in option 1. Bits 7 to 5 can be reserved. In accordance with some aspects of the subject matter disclosed herein, when the TMDS clock speed is <=320 MHz, bits 4-3 can be set to 11 and N can be set to 1440 for low speed transmission using an unconverted 10-bit TMDS data stream. When the TMDS clock speed is <340 MHz and >320 MHz, bits 4 and 3 can be set to 00. Video data can be separated into different frames. Similarly data island and control data can be separated into different frames.

As described above, the payload associated with the XGMII transmit side framing can be either an untouched TMDS bit stream if the TMDS clock speed is less than or equal to 320 MHz or can map 10-bit TMDS data to 8-bit if the TMDS clock speed is greater than or equal to 320 MHz. For video data periods, TMDS encoded 10-bit data can be decoded back to 8 bit. For data island periods, TERC4 10-bit data can be mapped back to 4-bit data at <D3:D0> and "0000" can be appended at <D7:D4>. For control periods, 10-bit data can be mapped back to 2-bit control data at <D0:D1> and "111111" can be appended at <D2:D7>. TMDS input data rate up to 11.5 Gbps can be achieved.

On the receive side (conversion of optical signals to electrical signals), TMDS clock recovery is required because optical signals are not associated with separate clocking data. To recover TMDS clock information, a phase-locked loop can be employed. A phase-locked loop or phase lock loop (PLL) is a control system that tries to generate an output signal whose phase is related to the phase of the input "reference" signal. It is an electronic circuit comprising a variable frequency oscillator and a phase detector. The VSync signal embedded in the framing and the number of characters in the VSync pulse can be extracted from the framing and can be used to generate a phase delta for the HDMI signal. The phase delta is provided to a loop filter which generates a clean XGMII clock signal which can be used for the clock data in the HDMI output using the formula $f_{out}=f_{in}*10/N_{VSync}$.

Figure 3:
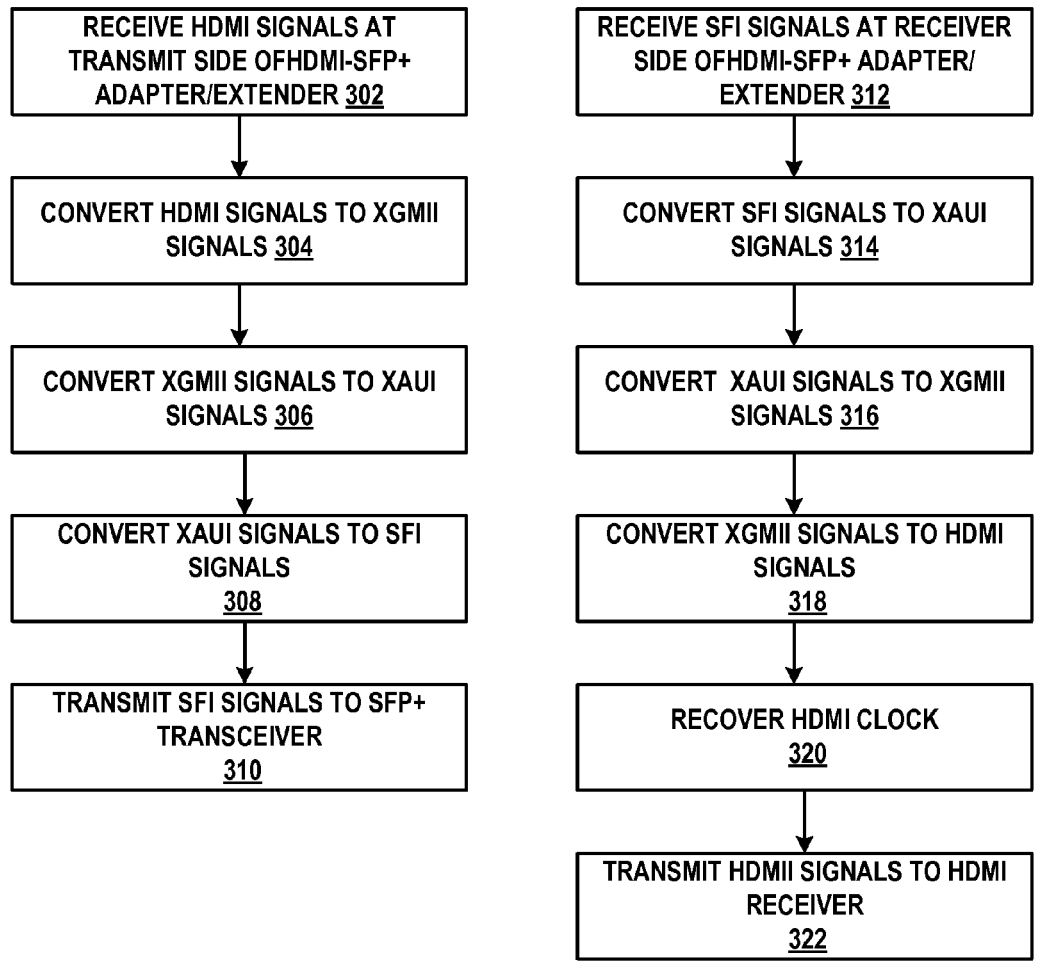
FIG. 3 is a flow diagram of an example of a process to extend the reach of an HDMI cable using an HDMI-SFP+ adapter/extender in accordance with aspects of the subject matter described herein.

FIG. 3 is a flow diagram 300 of an example of a method to extend the reach of an electrical cable using a module that converts electrical signals to optical signals and/or that converts optical signals to electrical signals. The electrical cable can be an HDMI cable. The module can be an HDMI-SFP+ adapter/extender as described above, in accordance with aspects of the subject matter described herein. At 302 a HDMI to XGMII converter of a first (transmit-side) HDMI-SFP+ adapter/extender can receive signals transmitted from an HDMI source. At 304 the signals received from the HDMI source can be converted to XGMII signals using the transmit-side XGMII framing described above.

At 306, an XGMII to XAUI converter of an HDMI-SFP+ adapter/extender can receive signals transmitted from the HDMI to XGMII converter and can convert the XGMII signals to XAUI signals. At 308 an XAUI to SFI converter of the HDMI-SFP+ adapter/extender can receive signals converted by the XGMII to XAUI converter and can convert the XAUI signals to SFI signals. The SFI signals can be transmitted from the XAUI to SFI converter to an SFP+ optical transmitter AT 310. The SFP+ optical transmitter can transmit the optical signals to an SFP+ optical receiver over a fiber. The SFP+ optical receiver can convert to the optical signals received from the SFP+ optical transmitter to SFI signals.

At 312 the SFI signals can be received by a second (receive-side) HDMI-SFP+ adapter/extender. At 314 the SFI to XAUI converter can receive the SFI signals and can convert them to XAUI signals. The SFI to XAUI converter can send the XAUI signals to the XAUI to XGMII converter. At 316 the XAUI to XGMII converter can receive the XAUI signals and can convert the XAUI signals to XGMII signals. At 320, TMDS clock recovery operations can be performed as described above to recover HDMI clock data. At 322 the HDMI signals can be transmitted to the HDMI receiver.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations. Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An HDMI (High-Definition Multimedia Interface)-SFP+ (Enhanced small form-factor pluggable) converter, comprising:
   a first converter that converts HDMI signals of a first type to SFI (Serders Framer Interface) signals of a second type, the first converter further comprising:
      an HDMI to XGMII (10 Gigabit Media Independent Interface) converter that receives HDMI signals and converts the HDMI signals to XGMII signals;
      an XGMII to XAUI (10 Gigabit Attachment Unit Interface) converter that receives the XGMII and converts the XGMII signals to XAUI signals; and
      an XAUI to SFI converter that receives the XAUI signals and converts the XAUI signals to SFI signals, the XAUI to SFI converter transmitting the SFI signals to an SFP+ optical transceiver; and
   a second converter that converts the SFI signals of the second type to the HDMI signals of the first type,
   wherein the signals of the first type comprise HDMI electrical signals and the signals of the second type comprise SFI electrical signals,
   wherein the second converter recovers an HDMI clock signal present in the HDMI signals of the first type that are input to the first converter, and
   wherein the first converter converts 10-bit data of the HDMI signals to 8-bit XGMII data.

2. The converter of claim 1, wherein 2 bits of the HDMI signals are removed from the 10-bit data, and wherein the 2 bits are associated with redundancy and error checking.

3. The converter of claim 1, wherein conversion of the 10-bit data of the HDMI signals to 8-bit XGMII data is performed in accordance with a data rate of the HDMI signals.

4. The converter of claim 3, wherein the conversion is performed when a Transition Minimized Differential Signaling (TMDS) clock speed is greater than 320 MHz.

5. The converter of claim 1, wherein the second converter further comprises:
   an SFI to XAUI converter that receives SFI signals and converts the SFI signals to XAUI signals;
   an XAUI to XGMII converter that receives the XAUI signals from the SFI to XAUI converter and converts the XAUI signals to XGMII signals; and
   an XGMII to HDMI converter that receives the XGMII signals from the XAUI to XGMII converter and converts the XGMII signals to HDMI signals.

6. The converter of claim 5, wherein the HDMI clock signal is recovered from the XGMII signals by the second converter.

7. The converter of claim 1, wherein an HDMI source provides the HDMI signals, and wherein the HDMI source comprises one of a set-top box, a DVD player, a Blu-ray player, a digital video recorder, or a personal computer.

8. The converter of claim 1, wherein an HDMI sink receives the HDMI signals from the second converter, and wherein the HDMI sink comprises a display device.

9. A method of transmitting an HDMI (High-Definition Multimedia Interface) signal from an HDMI source to an HDMI sink, comprising:
   converting the HDMI signal received from the HDMI source to an optical signal, the converting comprising:
      converting an HDMI signal to a XGMII (10 Gigabit Media Independent Interface) signal;
      converting 10-bit data of the HDMI signal to 8-bit XGMII data;
      converting the XGMII signal to a XAUI (10 Gigabit Attachment Unit Interface) signal;
      converting the XAUI signal to an SFI (Serders Framer Interface) signal; and
      converting the SFI signal to an optical signal;
   transmitting the optical signal over an optical cable;
   receiving the optical signal from the optical cable;
   converting the optical signal back to the HDMI signal; and
   outputting the HDMI signal to the HDMI sink.

10. The method of claim 9, wherein the converting is performed in accordance with a data rate of the HDMI signal.

11. The method of claim 10, wherein the conversion is performed when a Transmission Minimized Differential Signaling (TMDS) clock speed is greater than 320 MHz.

12. The method of claim 9, wherein converting the optical signal back to the HDMI signal comprises:
   converting an optical signal to an SFI signal;
   converting the SFI signal to a XAUI signal;
   converting the XAUI signal to an XGMII signal; and
   converting the XGMII signal to the HDMI signal.

13. The method of claim 12, further comprising recovering an HDMI clock signal from the XGMII signal.

14. An HDMI transmission path extension apparatus, comprising:
   an HDMI (High-Definition Multimedia Interface) to SFP+ (small form-factor pluggable) converter;
   an optical communications link; and
   an SFP+ to HDMI converter,
   wherein the HDMI to SFP+ converter converts 10-bit data of received HDMI signals to 8-bit data in accordance with a Transmission Minimized Differential Signaling (TMDS) clock speed, and
   wherein the SFP+ to HDMI converter recovers an HDMI clock signal present in the HDMI signals input to the HDMI to SFP+ converter.

15. The apparatus of claim 14, wherein the HDMI to SFP+ further comprises:
   an HDMI to XGMII (10 Gigabit Media Independent Interface) converter that receives HDMI signals and converts the HDMI signals to XGMII signals;
   an XGMII to XAUI (10 Gigabit Attachment Unit Interface) converter that receives the XGMII and converts the XGMII signals to XAUI signals; and
   an XAUI to SFI converter that receives the XAUI signals and converts the XAUI signals to SFI signals, the XAUI to SFI (Serders Framer Interface) converter transmitting the SFI signals to an SFP+ optical transceiver.

16. The apparatus of claim 14, wherein the SFP+ to HDMI converter further comprises:
   an SFI to XAUI converter that receives SFI signals and converts the SFI signals to XAUI signals;
   an XAUI to XGMII converter that receives the XAUI signals from the SFI to XAUI converter and converts the XAUI signals to XGMII signals; and an XGMII to HDMI converter that receives the XGMII signals from the XAUI to XGMII converter and converts the XGMII signals to HDMI signals.

* * * * *